Patented Dec. 10, 1929

1,738,888

UNITED STATES PATENT OFFICE

BYRON B. GOLDSMITH, OF NEW YORK, AND HAROLD GROSSMAN, OF BRONX, NEW YORK, ASSIGNORS TO THE AMERICAN LEAD PENCIL COMPANY, A CORPORATION OF NEW YORK

PENCIL LEAD AND METHOD OF MAKING SAME

No Drawing. Application filed August 5, 1922. Serial No. 579,970.

This invention relates to the manufacture of pencil leads, crayons and like articles adapted for marking upon surfaces, and has for its object the improvement of such articles and the provision of a method whereby the preparation thereof is facilitated, particularly by the elimination of prolonged grinding which has been necessary heretofore to ensure suitable fineness of the material.

In the manufacture of black pencil leads, which may be considered as illustrative of the production of crayons and the like, it is of primary importance that the constituents of the mixture used be very finely divided so that a smooth marking element may be produced. Thus, in accordance with usual practice heretofore, clay and graphite, the latter preferably of the amorphous variety, are selected for purity. The clay is washed to remove as much sand as possible and dried. The graphite is ground and air-floated to ensure the desired fineness. The clay and graphite are then mixed in the desired proportions with water and the mixture is ground. The time devoted to grinding varies with the quality of lead which is to be produced. It must in any event be prolonged to ensure a homogeneous and smooth-writing product and frequently consumes weeks in preparing leads of high quality. When grinding is completed the mass is filter-pressed to remove surplus moisture and is worked into the desired shape and baked.

We have discovered that the tedious and expensive grinding may be eliminated and that the particles may be reduced to a finer condition than is possible by grinding and in a much shorter time, or if grinding is done, the time of grinding can be greatly reduced to produce satisfactory results. Our invention depends upon the deflocculation of one or both of the constituents of the mixture, that is to say, dispersion of the particles so that they will remain suspended in a liquid for a subsantially indefinite period and will pass readily through ordinary filter media.

In carrying out the invention, the essential constituents of the mixture may be separately deflocculated and thereafter combined, or the constituents may be mixed and then deflocculated. In some cases it is desirable to grind either or both of the constituents of the mixture with a deflocculating agent as this promotes the production of the dispersed phase which is fundamental to our invention. It is not essential that either or both of the constituents be completely deflocculated although the desired fineness is approached to a higher degree if deflocculation is substantially complete. Mixtures containing flocculated and deflocculated materials are within our invention. In carrying out the invention material unaffected by the deflocculating agent may be retained or separated as desired. It may be readily separated since the deflocculated material passes through ordinary filter media which will retain the flocculated material. It may also be separated by settling followed by decantation of the suspension or by an operation wherein the material passes through a series of tanks in which the flocculated particles settle while the deflocculated material passes on through the tanks.

As a specific example of the invention, clay may be suspended in water and then treated with a deflocculating agent. Caustic soda in the proportion of 0.5% of the dry weight of the clay is a suitable deflocculating agent and ensures dispersion of the clay and its conversion, therefore, into a much finer state of division than is otherwise possible. Likewise, graphite, after it has been ground and air-floated, may be mixed with about 30% of water and a deflocculating agent such as magnesium oleate, tannin or tannin-containing materials or casein dissolved in sodium phosphate. A suitable proportion of tannin is 5% of the dry weight of the graphite and of magnesium oleate 1% of the weight of the dry graphite. After addition of the deflocculating agent, the mass is mixed in a revolving drum or other suitable mixer and water is added to suspend the particles. Tannin and tannin-containing materials may also be used for deflocculating clay. As mentioned above, the graphite can be ground with a solution of the deflocculating agent.

The specific deflocculating agents mentioned are merely illustrative of the invention. Numerous agents of this character are well known. Some are more effective than others so that the particular agent employed depends primarily upon the material to be treated.

When the clay and graphite, for example, have been deflocculated as described, they may be mixed in suitable proportions while suspended in a liquid such as water; the water may be removed by evaporation and the mass formed into strands, or the material can be flocculated by the addition of an agent such as an acid which causes the particles to settle rapidly. Thus the water may be removed by decantation or by filtration. A filter press may be used because the flocculated material will not pass through the filter medium. If desired, the clay and graphite may be separately dewatered without flocculation. The clay and graphite may then be mixed in the desired proportions. It is understood that it is within the scope of my invention to flocculate the graphite and leave the clay in the deflocculated condition or vice versa. We therefore have the following possibilities. Deflocculating the clay and the graphite or either of them, and not flocculating, or deflocculating the clay and the graphite or either of them and flocculating and deflocculating both and only flocculating one of them.

It is also practicable to mix the clay and graphite in suitable proportions previous to deflocculation and then to add a deflocculating agent with water to produce a suspension. As pointed out above, tannin and tannin-containing materials are suitable deflocculating agents for both clay and graphite. The water may be removed with or without flocculation as hereinbefore described. Even though some of the material is not deflocculated by the procedure described, satisfactory results may be obtained. If it is desired to get a greater amount of material deflocculated, it can be accomplished by grinding with a solution of the deflocculating agent.

Whichever procedure, as hereinbefore outlined, is followed in the preparation of the material, the mixture is kneaded to the proper consistency, pressed into strands and baked. A pencil lead of superior quality is thus produced in a less expensive and more satisfactory manner than has been possible heretofore. The high quality of the leads results particularly from the fine division of the constituents induced by the deflocculation thereof. We have found it to be advantageous to incorporate a deflocculating agent with a mixture of clay and graphite which contains a little water so as to form a thick paste or dough. An agent which deflocculates one or both constituents of the mixture may be used. Such a deflocculating agent may be added to the mass in the kneading machines before pressing with beneficial effect in the smoothness and tensile strength of the finished leads.

Our invention is applicable to the production of pencil leads and crayons from carbon black, it being possible to deflocculate this material. The invention is also applicable in the manufacture of colored leads or crayons which are usually made of clay with the addition of pigments or aniline colors or both and of various gums and binders. In producing colored leads or crayons, either the clay or pigment or both may be deflocculated. If aniline colors are used, only the clay requires deflocculation. In this case it may be necessary to eliminate water by evaporation instead of filter pressing to prevent the aniline from running off with the water although it is possible to precipitate the aniline when flocculating the clay and to then filter-press the mass. The constituents of the mixtures may be combined and treated in accordance with the principles hereinbefore set forth and with variations within the scope of the invention.

In carrying out the invention, it is possible and may be desirable to grade the deflocculated material by the use of filter media having pores of different sizes. In this way it is possible to obtain, for example, the finest grades of material for the best pencil leads or crayons.

From the foregoing it will be understood that we are able, in accordance with the invention, to produce pencil leads and crayons of superior quality embodying partially or wholly deflocculated constituents such as are ordinarily reduced to the required fineness with great difficulty and at considerable expense. Leads and crayons so produced are preferable to any heretofore prepared by any method because of their density, smoothness and uniformity.

Among the advantages of our invention is the possibility of eliminating grit introduced in the grinding operation from the material. Stones are used for grinding and the grit entering the material as the grinding proceeds is considerable in amount and detrimental to the finished leads. Furthermore, it is possible by our method to eliminate nearly all of the grinding machinery commonly used and consequently to accomplish a considerable saving both in original cost of the plant and in the upkeep thereof. The time consumed in the preparation of the mixture is, as before stated, materially lessened.

Various changes may be made in the details of the invention without departing therefrom or sacrificing any of the advantages thereof.

We claim:—

1. The method of producing marking elements which consists in deflocculating the constituents of the composition of the marking elements, mixing the deflocculated constituents, flocculating the constituents and forming the marking elements therefrom.

2. The method of producing marking elements, which comprises deflocculating some of the constituents of the composition of the marking elements, mixing the deflocculated constituents with others, flocculating the constituents and forming the marking elements therefrom.

3. The method of producing marking elements, which comprises mixing deflocculated clay with deflocculated graphite, flocculating the constituents of the mixture and forming marking elements therefrom.

In testimony whereof we affix our signatures.

BYRON B. GOLDSMITH.
HAROLD GROSSMAN.